US012584684B2

(12) United States Patent
Hunter et al.

(10) Patent No.: US 12,584,684 B2
(45) Date of Patent: Mar. 24, 2026

(54) REFRIGERATOR

(71) Applicant: Dometic Sweden AB, Solna (SE)

(72) Inventors: William Hunter, Shelby Township, MI (US); Jan-Peter Loerts, Troy, MI (US)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 18/000,618

(22) PCT Filed: Jun. 1, 2021

(86) PCT No.: PCT/IB2021/054809
§ 371 (c)(1),
(2) Date: Dec. 2, 2022

(87) PCT Pub. No.: WO2021/245557
PCT Pub. Date: Dec. 9, 2021

(65) Prior Publication Data
US 2023/0243577 A1 Aug. 3, 2023

Related U.S. Application Data

(60) Provisional application No. 63/034,128, filed on Jun. 3, 2020.

(51) Int. Cl.
*F25D 23/10* (2006.01)
*B60N 3/10* (2006.01)
*F25D 23/00* (2006.01)

(52) U.S. Cl.
CPC ............. *F25D 23/10* (2013.01); *B60N 3/104* (2013.01); *F25D 23/006* (2013.01)

(58) Field of Classification Search
CPC ....... B60N 3/104; F25D 23/006; F25D 23/10; F25D 23/003; B60H 1/00592; B60H 1/241; B62D 33/048
See application file for complete search history.

(56) References Cited

U.S. PATENT DOCUMENTS

| | | | | | |
|---|---|---|---|---|---|
| 2,522,623 | A | * | 9/1950 | Likes | ..................... B60N 3/103 62/297 |
| 3,584,824 | A | * | 6/1971 | Belcer | ..................... B63B 25/28 410/82 |
| 4,213,310 | A | | 7/1980 | Buss | |
| D257,934 | S | | 1/1981 | Buss | |

(Continued)

FOREIGN PATENT DOCUMENTS

| | | |
|---|---|---|
| AU | 2707277 | 1/1979 |
| AU | 83403 | 9/1981 |

(Continued)

OTHER PUBLICATIONS

US 11,692,755 B2, 07/2023, Wang et al. (withdrawn)

(Continued)

*Primary Examiner* — Frantz F Jules
*Assistant Examiner* — Martha Tadesse
(74) *Attorney, Agent, or Firm* — Dinsmore & Shohl LLP

(57) ABSTRACT

Present embodiments provide a console refrigerator for use in a vehicle. More specifically, but without limitation, present embodiments provide a console refrigerator which may be easily integrated into a vehicle compartment or console for cooling of various items including, but not limited to, food, drink, or medicine.

21 Claims, 11 Drawing Sheets

(56)  References Cited

U.S. PATENT DOCUMENTS

| | | | |
|---|---|---|---|
| D267,444 S | 1/1983 | Ruxton | |
| D268,979 S | 5/1983 | Ruxton | |
| D269,398 S | 6/1983 | Ruxton | |
| D289,597 S | 5/1987 | Averitt | |
| D292,056 S | 9/1987 | Decker | |
| 4,696,412 A | 9/1987 | McGowan | |
| D307,998 S | 5/1990 | Costello et al. | |
| D323,950 S | 2/1992 | Pleet | |
| 5,319,937 A | 6/1994 | Fritsch | |
| D349,007 S | 7/1994 | Costello | |
| 5,338,081 A | 8/1994 | Young | |
| D352,420 S | 11/1994 | Costello | |
| D400,053 S | 10/1998 | Coffee | |
| 5,860,281 A | 1/1999 | Coffee | |
| 6,578,912 B2 * | 6/2003 | Hansen | B60N 2/0224 |
| | | | 297/217.3 |
| D486,357 S | 2/2004 | Leba | |
| D497,517 S | 10/2004 | Reuter | |
| D500,057 S | 12/2004 | Reuter | |
| 7,051,550 B2 | 5/2006 | Roth | |
| D527,226 S | 8/2006 | Maldonado | |
| D528,368 S | 9/2006 | Maldonado | |
| D529,344 S | 10/2006 | Maldonado | |
| 7,140,507 B2 | 11/2006 | Maldonado | |
| D534,771 S | 1/2007 | Zorn | |
| 7,344,028 B2 | 3/2008 | Hanson | |
| 9,366,467 B2 | 6/2016 | Kiedaisch | |
| D792,486 S | 7/2017 | Li | |
| D802,028 S | 11/2017 | Li | |
| D802,029 S | 11/2017 | Li | |
| D802,630 S | 11/2017 | Li | |
| D820,049 S | 6/2018 | Ahlstrom | |
| D836,993 S | 1/2019 | Meda | |
| D836,994 S | 1/2019 | Meda | |
| D844,386 S | 4/2019 | Ahlstrom | |
| D887,788 S | 6/2020 | Meda | |
| D888,503 S | 6/2020 | Meda | |
| D894,043 S | 8/2020 | Meda | |
| D901,986 S | 11/2020 | Meda | |
| D904,830 S | 12/2020 | Meda | |
| D907,074 S | 1/2021 | Yang | |
| D920,743 S | 6/2021 | Meda | |
| D921,439 S | 6/2021 | Meda | |
| 11,027,885 B2 | 6/2021 | Duong | |
| D927,938 S | 8/2021 | Meda | |
| D929,471 S | 8/2021 | Meda | |
| D933,449 S | 10/2021 | Ahlström | |
| 11,148,574 B2 | 10/2021 | Kim et al. | |
| D935,280 S | 11/2021 | Thelin | |
| D953,814 S | 6/2022 | Thelin | |
| D954,764 S | 6/2022 | Meda | |
| 11,359,848 B2 | 6/2022 | Guan | |
| 11,414,238 B2 | 8/2022 | Ahlström | |
| 11,415,355 B2 | 8/2022 | Thelin et al. | |
| 11,535,425 B2 | 12/2022 | Ahlström et al. | |
| 11,572,003 B2 | 2/2023 | Jung et al. | |
| 11,618,299 B2 | 4/2023 | Bae et al. | |
| 11,623,793 B2 | 4/2023 | Duong et al. | |
| D985,359 S | 5/2023 | Ahlström et al. | |
| D995,264 S | 8/2023 | Ahlström et al. | |
| 11,752,913 B2 | 9/2023 | Lee et al. | |
| 11,754,332 B2 | 9/2023 | Guan et al. | |
| 11,912,190 B2 | 2/2024 | Kang et al. | |
| 11,993,191 B2 | 5/2024 | Jung et al. | |
| 12,263,772 B2 | 4/2025 | Jung et al. | |
| 2004/0089582 A1 | 5/2004 | Hendrix, Jr. | |
| 2004/0178208 A1 | 9/2004 | Minh | |
| 2005/0127081 A1 | 6/2005 | Minh | |
| 2005/0263432 A1 | 12/2005 | Hanson | |
| 2005/0263527 A1 | 12/2005 | Maldonado | |
| 2005/0263528 A1 | 12/2005 | Maldonado | |
| 2005/0279123 A1 | 12/2005 | Maldonado | |
| 2005/0279124 A1 | 12/2005 | Maldonado | |
| 2007/0023439 A1 | 2/2007 | Vaughn | |
| 2007/0069541 A1 | 3/2007 | Sturt | |
| 2008/0001373 A1 | 1/2008 | Vaughn | |
| 2008/0006629 A1 | 1/2008 | Roth | |
| 2008/0025544 A1 | 1/2008 | Maldonado | |
| 2011/0182532 A1 | 7/2011 | Baltus | |
| 2011/0197625 A1 | 8/2011 | Urban | |
| 2013/0340467 A1 | 12/2013 | Kiedaisch | |
| 2017/0023290 A1 | 1/2017 | DeMuth | |
| 2018/0037150 A1 * | 2/2018 | Rotharmel | B60N 3/10 |
| 2018/0141718 A1 | 5/2018 | Ahlstrom | |
| 2019/0161240 A1 | 5/2019 | Ahlstrom | |
| 2019/0381923 A1 * | 12/2019 | Kim | B60N 3/104 |
| 2020/0023763 A1 | 1/2020 | Lee | |
| 2020/0062454 A1 | 2/2020 | Duong | |
| 2020/0140165 A1 | 5/2020 | Maldonado | |
| 2020/0216229 A1 | 7/2020 | Weixian | |
| 2020/0217571 A1 | 7/2020 | Weixian | |
| 2020/0217574 A1 | 7/2020 | Thelin | |
| 2020/0217575 A1 | 7/2020 | Thelin | |
| 2020/0217576 A1 | 7/2020 | Weixian | |
| 2020/0217578 A1 | 7/2020 | Wang | |
| 2021/0070523 A1 | 3/2021 | Iyer | |
| 2021/0070528 A1 | 3/2021 | Iyer | |
| 2021/0071930 A1 | 3/2021 | Iyer | |
| 2021/0123656 A1 | 4/2021 | Barros | |
| 2021/0127808 A1 | 5/2021 | Thelin | |
| 2021/0214123 A1 | 7/2021 | Iyer | |
| 2021/0229893 A1 | 7/2021 | Maldonado | |
| 2021/0253305 A1 | 8/2021 | Duong | |
| 2021/0285710 A1 | 9/2021 | Barros | |
| 2022/0114847 A1 | 4/2022 | Emde | |
| 2022/0114853 A1 | 4/2022 | Emde | |
| 2022/0119152 A1 | 4/2022 | Blankinship | |
| 2022/0228406 A1 | 7/2022 | Barros | |
| 2022/0290907 A1 | 9/2022 | Guan et al. | |
| 2022/0338603 A1 | 10/2022 | Gamboa et al. | |
| 2022/0355984 A1 | 11/2022 | Guan et al. | |
| 2022/0388722 A1 | 12/2022 | Ahlström et al. | |
| 2022/0390163 A1 | 12/2022 | Thelin et al. | |
| 2023/0030046 A1 | 2/2023 | Lundqvist et al. | |
| 2023/0032389 A1 | 2/2023 | Barros et al. | |
| 2023/0034471 A1 | 2/2023 | Rode et al. | |
| 2023/0131752 A1 | 4/2023 | Ahlström et al. | |
| 2023/0166901 A1 | 6/2023 | Harrison et al. | |
| 2023/0182530 A1 | 6/2023 | Bae et al. | |

FOREIGN PATENT DOCUMENTS

| | | |
|---|---|---|
| AU | 83402 | 4/1982 |
| AU | 93721 | 10/1986 |
| AU | 2005262599 | 1/2006 |
| AU | 2011215734 | 8/2012 |
| AU | 201712770 | 5/2017 |
| AU | 201712777 | 5/2017 |
| AU | 201712780 | 5/2017 |
| AU | 201712782 | 5/2017 |
| AU | 201712791 | 5/2017 |
| AU | 201712799 | 5/2017 |
| AU | 201712802 | 5/2017 |
| AU | 201712803 | 5/2017 |
| AU | 201712785 | 7/2017 |
| AU | 201716789 | 11/2017 |
| AU | 201716791 | 11/2017 |
| AU | 201717667 | 1/2018 |
| AU | 201717669 | 1/2018 |
| AU | 201717670 | 1/2018 |
| AU | 201717674 | 1/2018 |
| AU | 201717676 | 1/2018 |
| AU | 201717662 | 2/2018 |
| AU | 201816061 | 1/2019 |
| AU | 201910011 | 2/2019 |
| AU | 201913598 | 8/2019 |
| AU | 201913601 | 8/2019 |
| AU | 201913603 | 8/2019 |
| AU | 201913604 | 8/2019 |
| AU | 201913607 | 8/2019 |
| AU | 201913624 | 8/2019 |
| AU | 201913626 | 8/2019 |
| AU | 201913627 | 8/2019 |
| AU | 201913631 | 8/2019 |

(56) References Cited

FOREIGN PATENT DOCUMENTS

| | | | | | |
|---|---|---|---|---|---|
| AU | 201913633 | | 8/2019 | | |
| AU | 2018215766 | A1 | 8/2019 | | |
| AU | 202012545 | | 6/2020 | | |
| AU | 202012548 | | 6/2020 | | |
| AU | 2019284128 | | 7/2020 | | |
| AU | 2019284129 | | 7/2020 | | |
| AU | 2019284130 | | 7/2020 | | |
| AU | 2019284131 | | 7/2020 | | |
| AU | 2019284133 | | 7/2020 | | |
| AU | 2019284134 | | 7/2020 | | |
| AU | 2019302329 | | 1/2021 | | |
| AU | 2019325454 | | 1/2021 | | |
| AU | 2019376154 | | 3/2021 | | |
| AU | 2019371335 | | 5/2021 | | |
| AU | 2021269421 | A1 | 12/2021 | | |
| AU | 2022202482 | A1 | 11/2022 | | |
| AU | 2021278986 | A1 | 12/2022 | | |
| CA | 48429 | | 7/1981 | | |
| CA | 48762 | | 10/1981 | | |
| CA | 53100 | | 7/1984 | | |
| CA | 1281859 | | 3/1991 | | |
| CA | 2229259 | | 8/1998 | | |
| CA | 2460597 | | 9/2004 | | |
| CA | 2570413 | | 1/2006 | | |
| CA | 2789507 | | 8/2011 | | |
| CA | 179459 | | 12/2018 | | |
| CA | 179460 | | 12/2018 | | |
| CA | 3105713 | | 1/2020 | | |
| CA | 3106550 | | 2/2020 | | |
| CA | 3117297 | | 5/2020 | | |
| CA | 214387 | | 7/2022 | | |
| CN | 101370699 | | 2/2009 | | |
| CN | 101431913 | | 5/2009 | | |
| CN | 206031154 | U | 3/2017 | | |
| CN | 206488529 | | 9/2017 | | |
| CN | 207081259 | | 3/2018 | | |
| CN | 305240920 | | 10/2018 | | |
| CN | 108944607 | A | 12/2018 | | |
| CN | 106233083 | | 7/2019 | | |
| CN | 110191654 | | 8/2019 | | |
| CN | 110290975 | A | 9/2019 | | |
| CN | 209650128 | U | 11/2019 | | |
| CN | 209893773 | | 1/2020 | | |
| CN | 305553099 | | 1/2020 | | |
| CN | 305751278 | | 5/2020 | | |
| CN | 306079204 | | 9/2020 | | |
| CN | 112424547 | | 2/2021 | | |
| CN | 112585416 | | 3/2021 | | |
| CN | 112955703 | | 6/2021 | | |
| CN | 112996411 | | 6/2021 | | |
| CN | 115214988 | A | 10/2022 | | |
| CN | 307619228 | | 10/2022 | | |
| CN | 115298096 | A | 11/2022 | | |
| CN | 115667818 | A | 1/2023 | | |
| DE | 20110247 | | 12/2002 | | |
| DE | 202004010081 | | 9/2004 | | |
| DE | 202004011872 | U1 * | 11/2004 | ......... | B60H 1/00592 |
| DE | 202004019856 | U1 | 2/2005 | | |
| DE | 202007001638 | | 5/2007 | | |
| DE | 202009015164 | | 3/2010 | | |
| DE | 202014000386 | | 4/2014 | | |
| DE | 202013007655 | | 1/2015 | | |
| DE | 102016203084 | A1 | 8/2017 | | |
| DE | 102011100722 | | 11/2017 | | |
| DE | 102016214941 | A1 | 2/2018 | | |
| DE | 102019200065 | | 1/2019 | | |
| DE | 102019200067 | | 1/2019 | | |
| DE | 102019200068 | | 1/2019 | | |
| DE | 102019200070 | | 1/2019 | | |
| DE | 112017005901 | | 8/2019 | | |
| DE | 102019002377 | A1 | 10/2019 | | |
| DE | 102019200063 | | 7/2020 | | |
| DE | 102019200064 | | 7/2020 | | |
| DE | 212020000770 | U1 | 9/2022 | | |
| EP | 1765109 | | 3/2007 | | |
| EP | 2534026 | | 12/2012 | | |
| EP | 2772704 | | 2/2013 | | |
| EP | 3576980 | A1 | 12/2019 | | |
| EP | 3821186 | | 5/2021 | | |
| EP | 3841338 | | 6/2021 | | |
| EP | 3874211 | | 9/2021 | | |
| EP | 3876785 | | 9/2021 | | |
| EP | 4045856 | A1 | 8/2022 | | |
| EP | 4072950 | A1 | 10/2022 | | |
| EP | 4079184 | A1 | 10/2022 | | |
| EP | 4133221 | A1 | 2/2023 | | |
| ES | 1030365 | U | 8/1995 | | |
| ES | 1030365 | Y | 7/1996 | | |
| JP | 11006677 | | 1/1999 | | |
| KR | 1020040080384 | | 9/2004 | | |
| KR | 20070014670 | A | 2/2007 | | |
| KR | 100756997 | B1 | 9/2007 | | |
| KR | 20180090056 | A | 8/2018 | | |
| KR | 1020210040356 | | 4/2021 | | |
| KR | 1020210048496 | | 5/2021 | | |
| KR | 1020210084483 | | 7/2021 | | |
| KR | 20240054942 | A | 4/2024 | | |
| MX | PA04001493 | | 12/2004 | | |
| MX | PA06014878 | | 10/2007 | | |
| NL | 2017815 | B1 * | 5/2018 | | |
| RU | 2738284 | C1 | 12/2020 | | |
| RU | 2020140159 | A | 2/2021 | | |
| WO | 2005123539 | | 12/2005 | | |
| WO | 2006007266 | | 1/2006 | | |
| WO | 2006009537 | | 1/2006 | | |
| WO | 2007016092 | | 2/2007 | | |
| WO | 2008013973 | | 1/2008 | | |
| WO | 2011094355 | | 8/2011 | | |
| WO | 2011100522 | | 8/2011 | | |
| WO | 2014131679 | | 9/2014 | | |
| WO | 2018095957 | | 5/2018 | | |
| WO | 2018143693 | A1 | 8/2018 | | |
| WO | 2018233611 | | 12/2018 | | |
| WO | 2020013913 | | 1/2020 | | |
| WO | 2020041236 | | 2/2020 | | |
| WO | 2020091849 | | 5/2020 | | |
| WO | 2021050253 | | 3/2021 | | |
| WO | 2021050255 | | 3/2021 | | |
| WO | 2021050298 | | 3/2021 | | |
| WO | 2021086620 | | 5/2021 | | |
| WO | 2021145971 | | 7/2021 | | |
| WO | 2021154394 | | 8/2021 | | |
| WO | 2022081513 | | 4/2022 | | |
| WO | 2022232513 | A1 | 11/2022 | | |
| WO | 2023275799 | A1 | 1/2023 | | |
| WO | 2023009603 | A1 | 2/2023 | | |
| WO | 2023101721 | A1 | 6/2023 | | |

OTHER PUBLICATIONS

Range Rover; 2006-2013 Range Rover Sport Center Console Cool Box Refrigerator, Amazon, Retrieved from: https://www.amazon.ca/2006-2013-Range-Rover-Refrigerator-LR076833/dp/B076ZTMWD5, Retrieved on: Feb. 20, 2020.

Patent Cooperation Treaty; International Search Report and Written Opinion issued in application No. PCT/IB2021/054809, 11 pages, dated Aug. 18, 2021.

Dometic Product Catalog—Coolers; 2015.

Dometic Product Catalog—Coolers; 2016.

Design U.S. Appl. No. 29/820,716, filed Dec. 23, 2021 titled Container.

Design U.S. Appl. No. 29/820,717, filed Dec. 23, 2021 titled Container.

U.S. Appl. No. 18/332,925, filed Jun. 12, 2023 titled Insulated Container.

Design U.S. Appl. No. 29/840,161, filed May 26, 2022 titled Cooler Fender Frame.

Design U.S. Appl. No. 29/836,642, filed Apr. 28, 2022 titled Half Sleeve Ice Block.

Design U.S. Appl. No. 29/823,704, filed Jan. 19, 2022 titled Insulated Box.

(56)        References Cited

OTHER PUBLICATIONS

MX Application No. MX/f/2022/002028 filed Jul. 19, 2022 titled Insulated Box.
EU App. No. 009092620 filed Jul. 19, 2022 titled Insulated Box.
U.S. Appl. No. 63/482,354, filed Jan. 31, 2023 titled Modular Container.
U.S. Appl. No. 18/464,742, filed Sep. 11, 2023 titled Mobile Cooling Box with Ice Maker.
Thailand Patent Application No. 1702001859 filed May 22, 2017 titled Cooler.
PCT Application No. PCT/IB2021/054809 titled "Refrigerator" filed on Jun. 1, 2021.
EP Application No. 21732536.4 titled "Refrigerator" filed on Oct. 13, 2022.
U.S. Appl. No. 63/034,128 titled "Refrigerator" filed Jun. 3, 2020.
Office Acton Mailed in EP Application No. 21732536.4 on Feb. 12, 2024.

* cited by examiner

REFRIGERATOR

CROSS REFERENCE TO RELATED APPLICATIONS

This 35 U.S.C. § 371 National Stage Patent application claims priority to and benefit of PCT Patent Application No. PCT/IB2021/054809, filed Jun. 1, 2021, which claims priority to and benefit of U.S. Provisional Patent Application Ser. No. 63/034,128, filed Jun. 3, 2020, all of which is incorporated herewith.

BACKGROUND

1. Field of the Invention

Present embodiments provide a console refrigerator for use in a vehicle. More specifically, but without limitation, present embodiments provide a console refrigerator which may be easily integrated into a vehicle compartment for cooling of a food, drink, or medicine.

2. Description of the Related Art

While active cooling facilities may be provided as an OEM feature in some vehicles, none are known to be removable. Further, non-OEM coolers typically look out of place and non-integrated in current vehicles.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments provide a refrigerator, or sometimes referred to as a cooler, which may be active or passively cooled, and which may be removably positioned within a compartment or console of a vehicle. The refrigerator is removable so that the refrigerator may be removed and used remotely from the vehicle.

According to some embodiments, a console refrigerator comprises a refrigerator housing having cooling mechanicals which remove heat from the refrigerator housing, the refrigerator housing configured to be positioned within a vehicle. An interior of the refrigerator housing defines a cavity for storage of food or beverage. A joint capable of removably connecting the refrigerator housing to a compartment of the vehicle. The joint may have a first portion associated with the refrigerator housing and a second portion associated with the compartment of the vehicle.

According to some optional embodiments, the joint may comprise a grommet and an insert which are removably pressfit together. The insert may have a body and a head, the grommet receiving the head. The joint may be a twist lock. The joint may further comprise at least one locking tab and an engagement feature. The joint may comprise an interference fit between two or more parts. The two or more parts may comprise the console refrigerator and the compartment of the vehicle. The console refrigerator may further comprise a housing insert. The housing insert may be a foam insert. The housing insert may be a bracket connected to the refrigerator housing. The console refrigerator may further comprise a frame which supports the cooling mechanicals. The first portion may be connected to the bracket. The console refrigerator may further comprise a tray disposed adjacent to the refrigerator housing and enclosing an opening between the refrigerator housing and a vehicle console. The console refrigerator may further comprise vent holes disposed in the tray. The cooling mechanicals may comprise a compressor, a condenser, and an evaporator. The console refrigerator may further comprise a console disposed in an automobile, marine craft, or a recreational vehicle. The refrigerator housing may be capable of being removably positioned within said console, a trunk, a frunk, or a compartment of the vehicle. The console refrigerator may be capable of being used as a portable cooler. The console refrigerator may be actively cooled, passively cooled, or both.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

In order that the embodiments may be better understood, embodiments of a refrigerator, for example a console refrigerator, will now be described by way of examples. These embodiments are not to limit the scope of the claims as other embodiments of a refrigerator will become apparent to one having ordinary skill in the art upon reading the instant description. Non-limiting examples of the present embodiments are shown in figures wherein:

DETAILED DESCRIPTION

Figure 1:
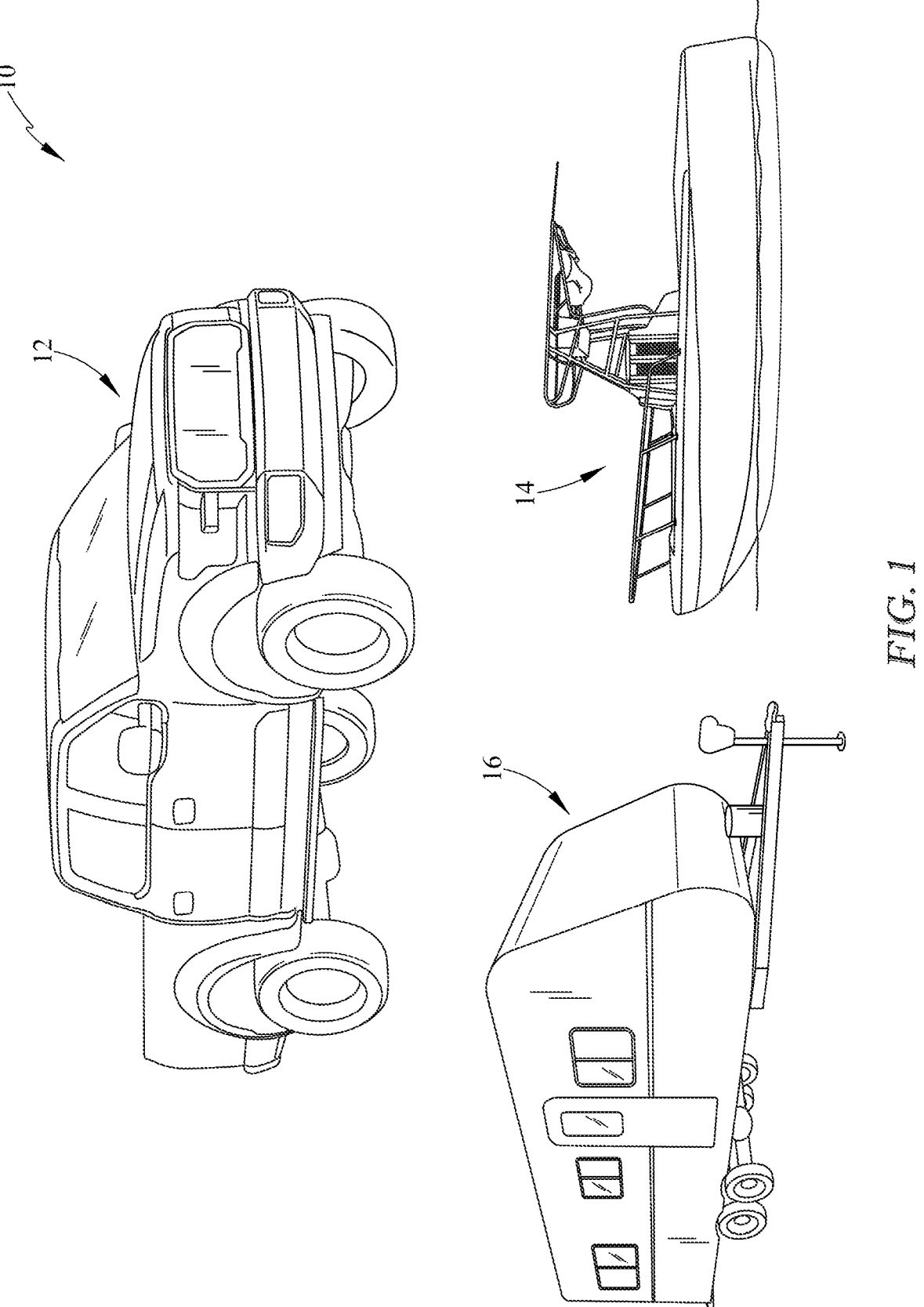
FIG. 1 provides perspective view of various example vehicles that may be used with the present embodiments.

It is to be understood that a refrigerator is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-9, embodiments of a console refrigerator are provided which may be located in a vehicle within a console or compartment. The console refrigerator may be formed to fit nicely and have a corresponding OEM appearance when installed. The refrigerator may also be removable so that it may be used at least for a limited period of cooling time outside the vehicle for a plurality of uses, such as storage of lunch, drinks, medicine, picnics and other uses, within or away from the vehicle. While the term refrigerator is used throughout this teaching, the term encompasses the also commonly used term cooler, which may function actively or passively, as described further herein.

It would be desirable to provide an integrated appearing cooling facility which has an OEM look rather than a less desirable aftermarket appearance.

Referring now to FIG. 1, a plurality of vehicles are shown in various configurations. An automotive vehicle 10, for example a pickup truck 12 as shown or a sedan in some embodiments. Any of various over the road vehicles, personal, or commercial may be utilized. In another embodiment, a marine craft 14 is shown representative of an alternate type of vehicle. In still a third example of a vehicle, a recreational vehicle 16 is shown. While the recreational vehicle 16 is shown as a tow behind camper, it should be understood that the term recreational vehicle may also include coaches, or other self-propelled RVs. Various type of other vehicles 10 are also considered within the scope of the present embodiments, and therefore this list is merely illustrative and not exhaustive.

Any of the vehicles may have various compartments, for storage of any of various materials. For example, the pickup 12 may have a console which is disposed between the front seats of the vehicle within which a cavity is found for storage. Within the sedan vehicle, a trunk is typically found at the rear of the vehicle wherein items may be stored. With electric vehicles and mid-engine vehicles, a front trunk or "frunk" may often be provided for storage. Likewise, marine crafts and RVs typically have various locations wherein items may be stored. Within any of these vehicles, the console or compartment may be located in any of various locations and therefore the examples provided are not limiting or exhaustive.

Any of the storage locations may be prime location for positioning of a refrigerator which may be used to cool food, drinks, or medicine. The present embodiments provide a refrigerator which may be positioned in various of these compartments. The refrigerator may be removably installed in a seamless integrated manner in order to provide an OEM installation look rather than an aftermarket appearance.

Figure 2:
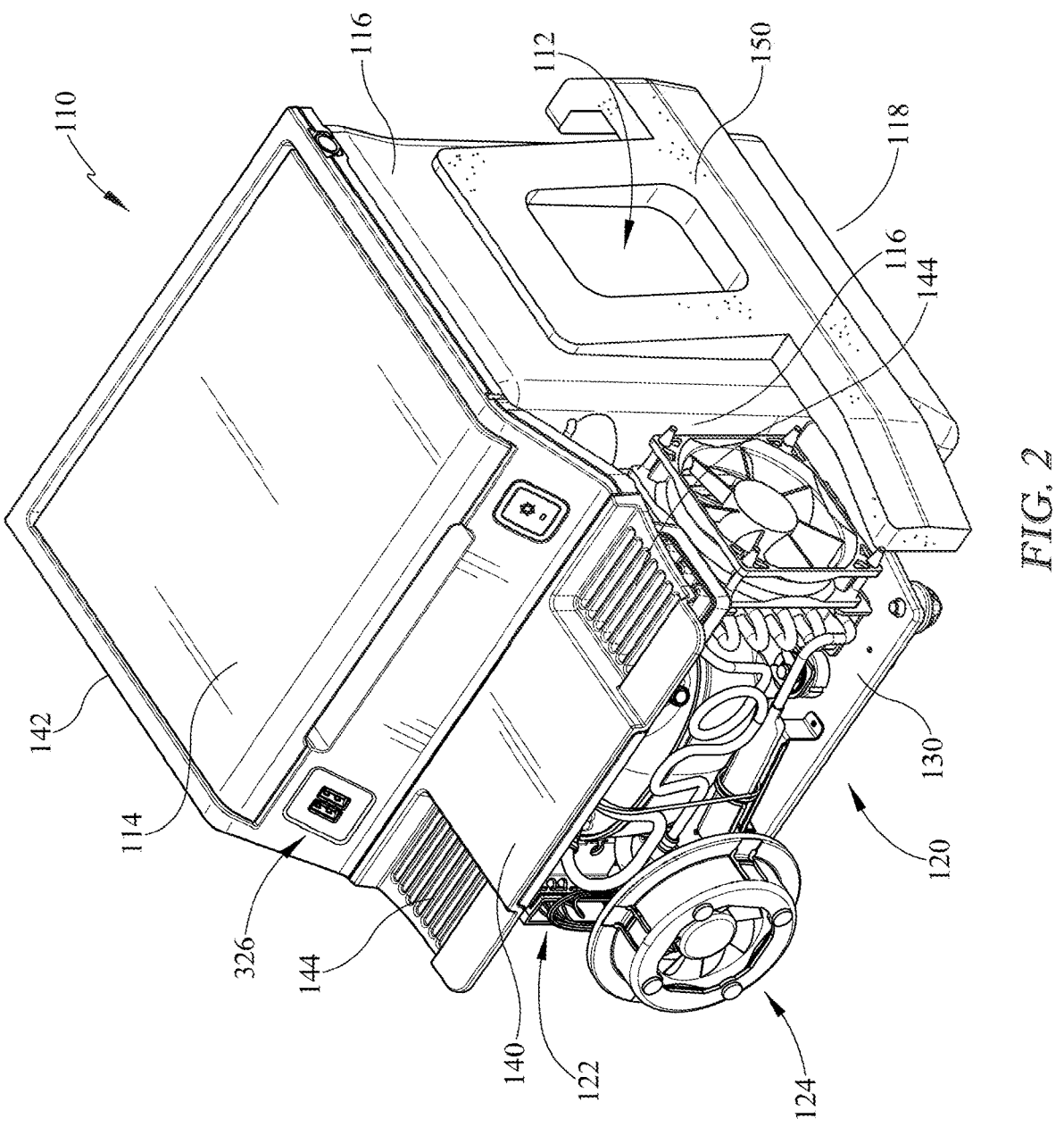
FIG. 2 is a perspective view of an example console refrigerator removed from a vehicle.

Referring now to FIG. 2, an upper perspective view of a refrigerator 110 is depicted. The refrigerator 110 may be disposed in a plurality of compartments within a multitude of vehicles and is generally referred to as a console refrigerator 110, but such console reference should not be considered limiting of the type of compartment wherein the refrigerator 110 may be disposed.

The refrigerator 110 is shown having a housing 112 and a lid 114. The lid 114 is shown in one embodiment, along an upper side of the housing 112, but may be a door or other cover disposed on any side of the housing 112, depending on the housing configuration and from where the refrigerator will be accessed. The lid 114 is capable of pivoting from the closed position (shown) to an open position for access within the housing 112. The housing 112 may have one or more sidewalls 116 and a bottom 118. Various shapes and configurations may be used which provide an interior cavity for food, drink, or medicine storage.

Figure 3:
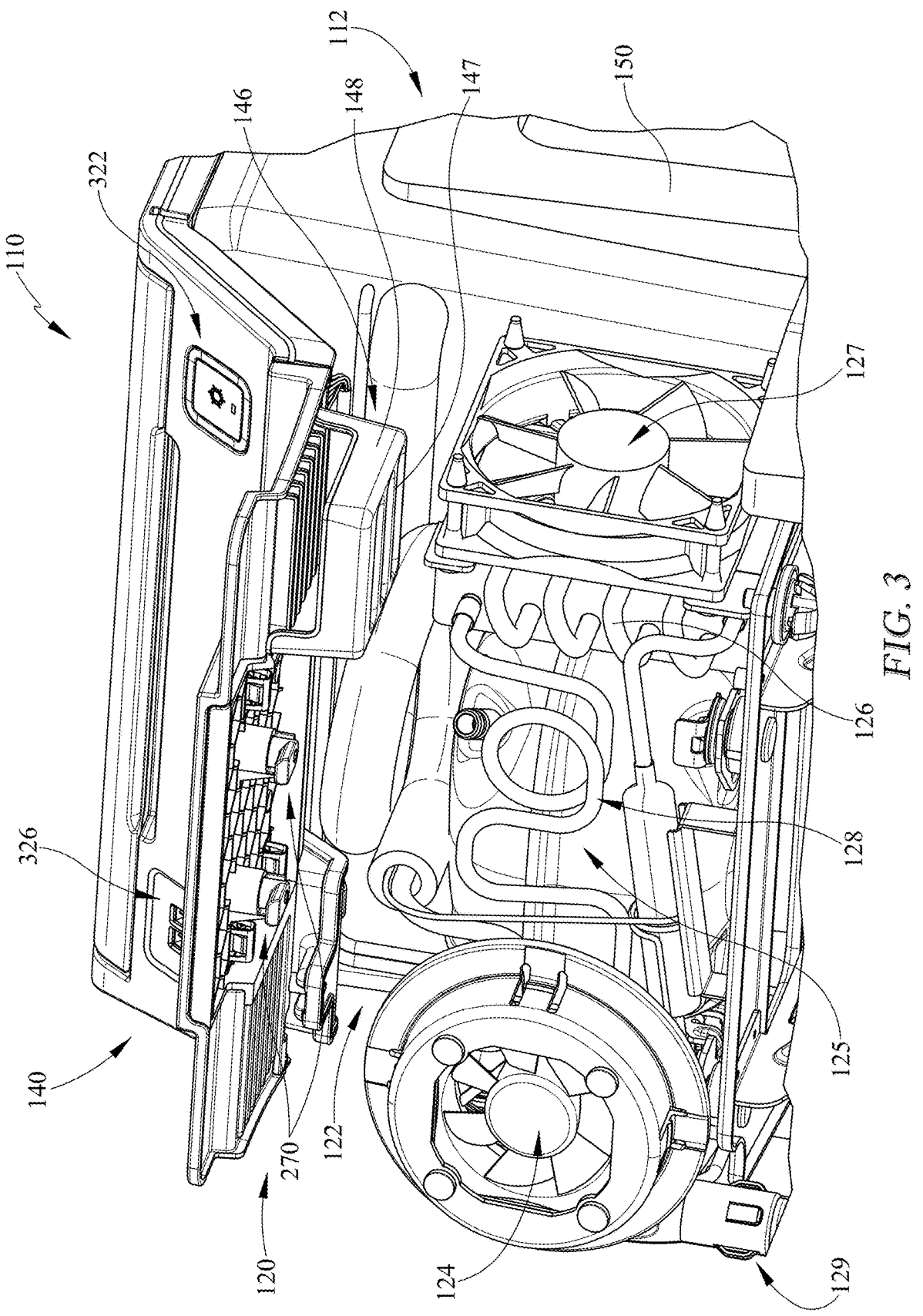
FIG. 3 is a perspective view of a front portion of an example console refrigerator which depicts a spill tray beneath a primary tray.

Disposed along one side of the housing 112 are cooling mechanicals 120. The cooling mechanicals 120 are defined as the mechanical components that provide heat exchange for the interior of the housing and to atmosphere. In some embodiments, the cooling mechanicals may be a thermoelectric device for cooling the interior of the housing 112. In other embodiments, the cooling mechanicals 120 may be a compression system having for example a compressor, condenser, expansion valve, evaporator and a heat exchange fluid such as a refrigerant. In the depicted embodiment, a compression system 122 is depicted. A fan 124 is shown at a forward end of the cooling mechanicals 120 to move heat away from the other cooling mechanicals 120. Above frame 130, there is a fin tube condenser 126. Adjacent to condenser 126 is a fan 127 (FIG. 3).

A refrigerant conduit may pass within the housing 112 walls 116, or may pass through one sidewall 116 to a fin pack, cooling plate, or other heat exchange structure within the housing 112. Such heat exchange structure removes heat from the interior of the refrigerator housing 112.

The cooling mechanicals 120 are positioned next to the housing 112 on a frame 130. The frame 130 may be directly connected to the housing 112 or may be indirectly connected such as by intermediate connection to a bracket or other structural element which is connected to the housing 112. Additionally, the frame 130 may also be positioned next to the housing 112 but not connected to the housing 112.

While the frame 130 provides a lower support for the cooling mechanicals, the instant embodiments may also provide an upper cover for the cooling mechanicals 120. This upper cover may be in the form of a tray 140. The housing 112 may be positioned within a compartment or console which is a larger size than the refrigerator 110, so that the refrigerator 110 may fit therein. The tray 140 covers the remainder of the opening in the compartment or console so that a large gap is not visually present upon installation of the refrigerator 110. This provides an OEM look rather than aftermarket appearance and also precludes spillage or dropping of objects into the compartment which may be hard to retrieve, and which may damage the function of the cooling mechanicals 120.

In some embodiments, the tray 140 may be integrated with the surround or bezel 142 in order to provide a desirable finished appearance and which looks integrated with the originally designed compartment, for example. In other embodiments, the tray 140 may be connected mechanically to the housing 112 or abutting the housing 112 but not connected.

The tray 140 further comprises first and second air intakes 144. The air intakes 144 may provide slots for air flow to move toward the system fan 124. The air may also exhaust through the tray 140 or alternatively may be routed to other locations, such as below the console or other areas of the vehicle compartments.

According to some embodiments, the tray 140 allows air flow but precludes spilled liquids from dripping on to the cooling mechanicals 120 below. Referring to FIG. 3, for example, below the tray 140 may be a spill tray 146 which is beneath one or both trays 140. The spill tray 146 may have a floor 147 and walls 148 but is open to air flow above or around the walls 148. Thus if liquids fall through the tray 140, the spill tray 146 collects the liquid within the walls 148, while still allowing air to move through the air and beneath the tray 140 for heat exchange.

The tray 140 or bezel portion 142 may also have additional features. For example, one or more USB ports 326 may be provided for charging or powering of devices.

Referring again to FIG. 2, housing may also include a housing insert 150 which may be a soft insert or a hard insert. The housing insert 150 may be a soft foam type insert which centers the housing 112 within the compartment or console, or alternatively precludes rocking or wobble of the housing 112 by filling space between the housing 112 and the console or compartment where the refrigerator 110 is located. In other embodiments, a hard housing insert may be used. For example, the housing insert 150 may be in the form of a metal or molded plastic bracket which connects to the housing 112 and allows connection of other structures to the housing 112. The hard housing insert 150 may also be used to fill space within the console or compartment so as to preclude rocking or movement of the housing 112.

Referring now to FIG. 3, a perspective view of the refrigerator 110 is shown. The instant view is used to describe the cooling mechanicals 120. A compression system 122 is shown having a compressor 125, a condenser 126, a condenser fan 127, a system or fresh air fan 124, and refrigerant conduit 128 extending between the components. The compressor 125 may be a single speed or variable speed compressor and may be a reciprocal type compressor, for non-limiting example. The compressor 125 may compress the refrigerant and decrease the pressure by way of an expansion valve or capillary tube, as shown with the conduit 128. The fin type condenser 126 receives the refrigerant via the conduit 128 and the condenser fan 127. The coiled and curved conduit 128 not only transfers the refrigerant but also damps or absorbs vibration between the various cooling mechanicals 120 to reduce transmission of vibration between components and also from vehicle travel.

As depicted, the system fan 124 pulls air through the tray 140 and vents therein. The air moves across the compressor 125 in order to remove heat, which would otherwise result in cooling problems for the mechanicals 120 and any cup holders in the area. The fan 124 expels the air via the fan blades shown in some embodiments, may direct air into the console area of the vehicle for diffusive purpose.

The condenser fan 127 moves air across the condenser 126 to cool the refrigerant, as one skilled in the art will understand. The air movement of the condenser fan 127 may be into the mechanicals or away from the components. If the air is pushed into the cooling mechanicals 120, the air moved by the condenser fan 127 may also be removed by the system fan 124.

Also shown at the left side of the figure, partially hidden by fan 124, is a power adapter 129. The adapter 129 is depicted as a 12v cigarette lighter type adapter. Other quick disconnect connections may also be used. Still further, other types of power supplies may be utilized, including a hard wiring style, if the refrigerator 110 will not be removed.

The refrigerator 110 may be removably installed to provide ability to remove the refrigerator 110 and use in various ways, for example to picnic or as a lunch box. The refrigerator 110 may be removed in a variety of ways.

Figure 4:
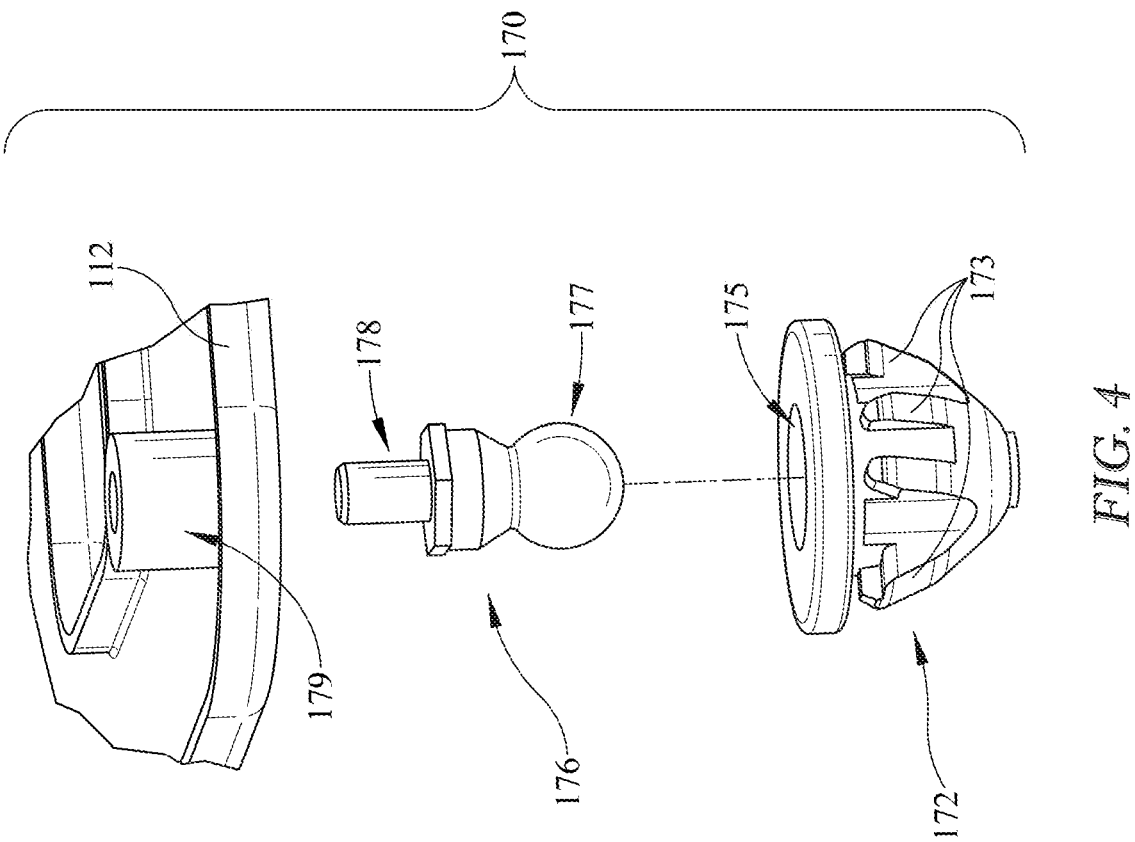
FIG. 4 is an exploded perspective view of a joint which is used for connection and removal of the refrigerator from the vehicle.

Referring now to FIG. 4, an example is provided of a joint 170. The joints described herein may take various forms. The joint 170 may be associated on one side with a housing 112 and on the second side the compartment or console. On the console side, a grommet 172 which receives the other portion of the joint structure 170. The grommet 172 may be installed by forming a hole in the compartment or console, such as by drilling. The grommet 172 may be pushed into the drilled hole, for example so that catches 173 retain the grommet 172 in position. The grommet 172 may also have an upper aperture 175 which receives an insert 176.

The insert 176 is shown above the grommet 172 and represents the second side of the disconnectable joint 170. The insert 176 comprises a head 177 and a body 178. The body 178 may be threaded or may be sized for an interference fit and formed within either of the housing 112 or a bracket which may be connected to the housing. In the instant embodiment, a threaded receiver 179 may be provided on the housing 112. In some other embodiments, a nut 179 is disposed on the bracket to receive the insert 176. With the insert 176 connected to the housing 112, directly or indirectly, and with the grommet 172 connected to the console or compartment, the insert 176 may be press-fit into the aperture 175 (FIG. 4) within the grommet 172.

Figure 5:
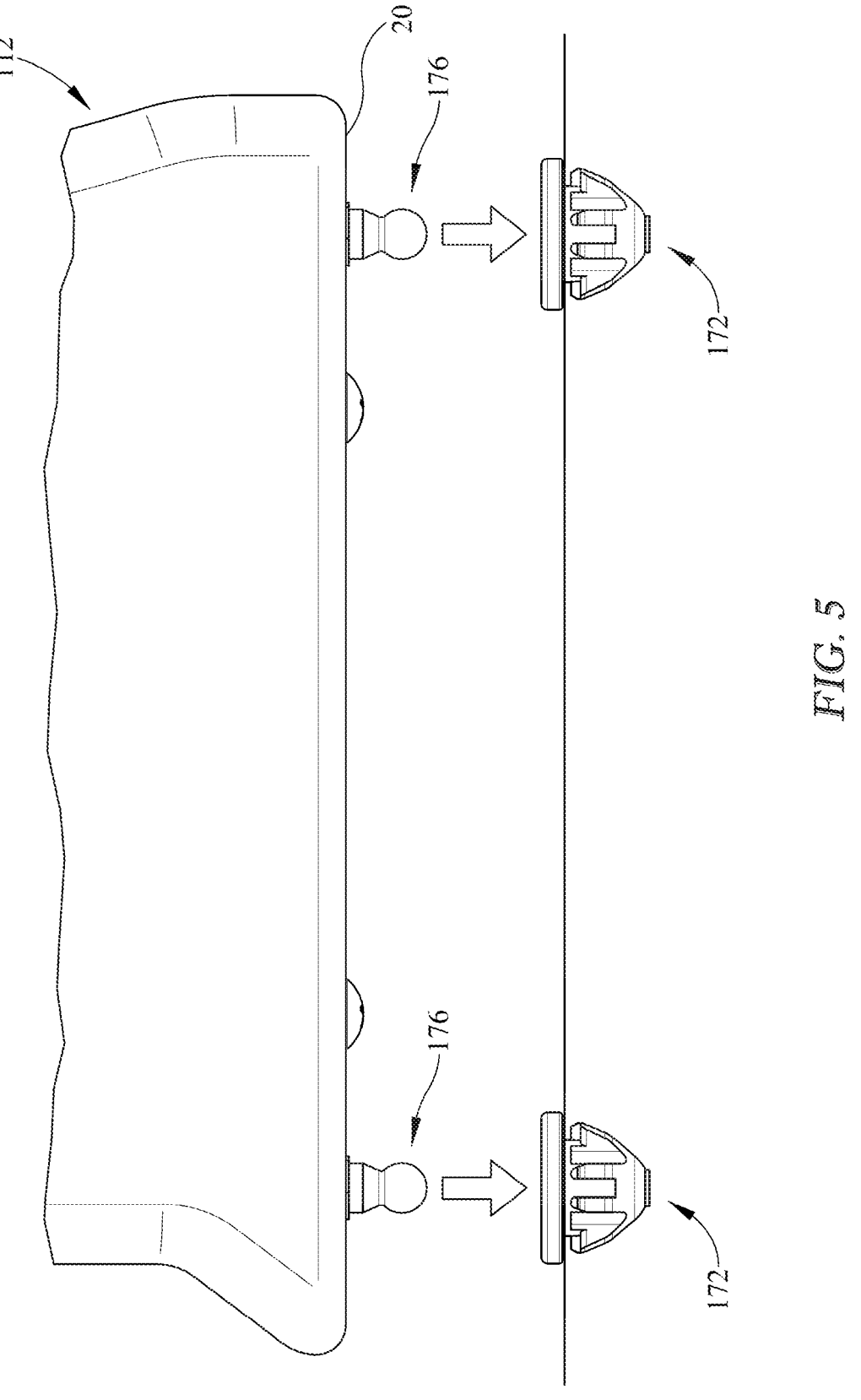
FIG. 5 is an elevation view of refrigerator joint separated.

With reference to FIG. 5, an alternate embodiment is shown wherein the insert 176 is directly connected to the housing 112 in the bottom 118 of the housing 112. In this view, the console or compartment 20 is represented by a flat structure. The insert 176 is shown moving toward connection with the grommets 172.

Figure 6:
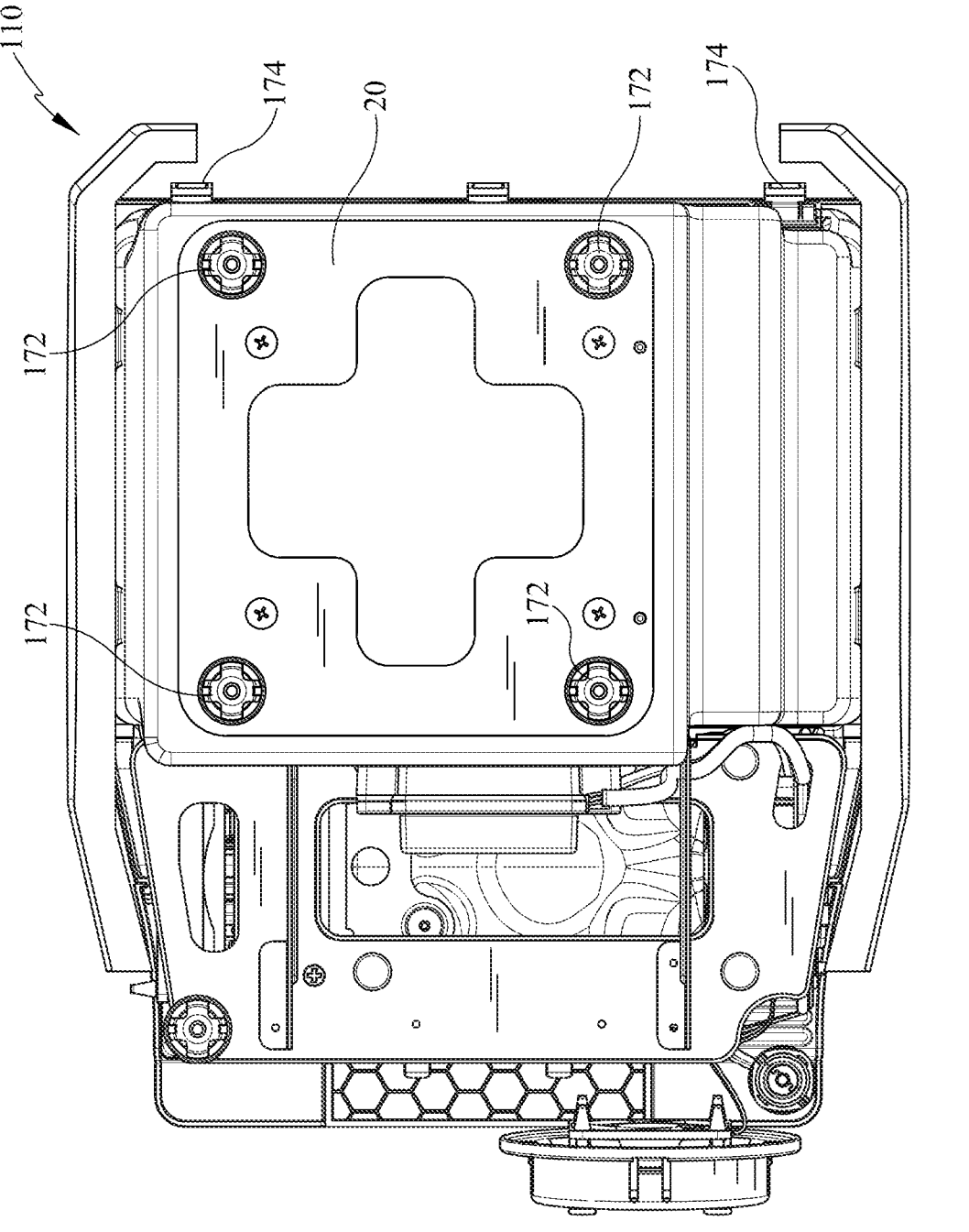
FIG. 6 is a bottom view of the example refrigerator which shows mounting locations of various joints.
Figure 7:
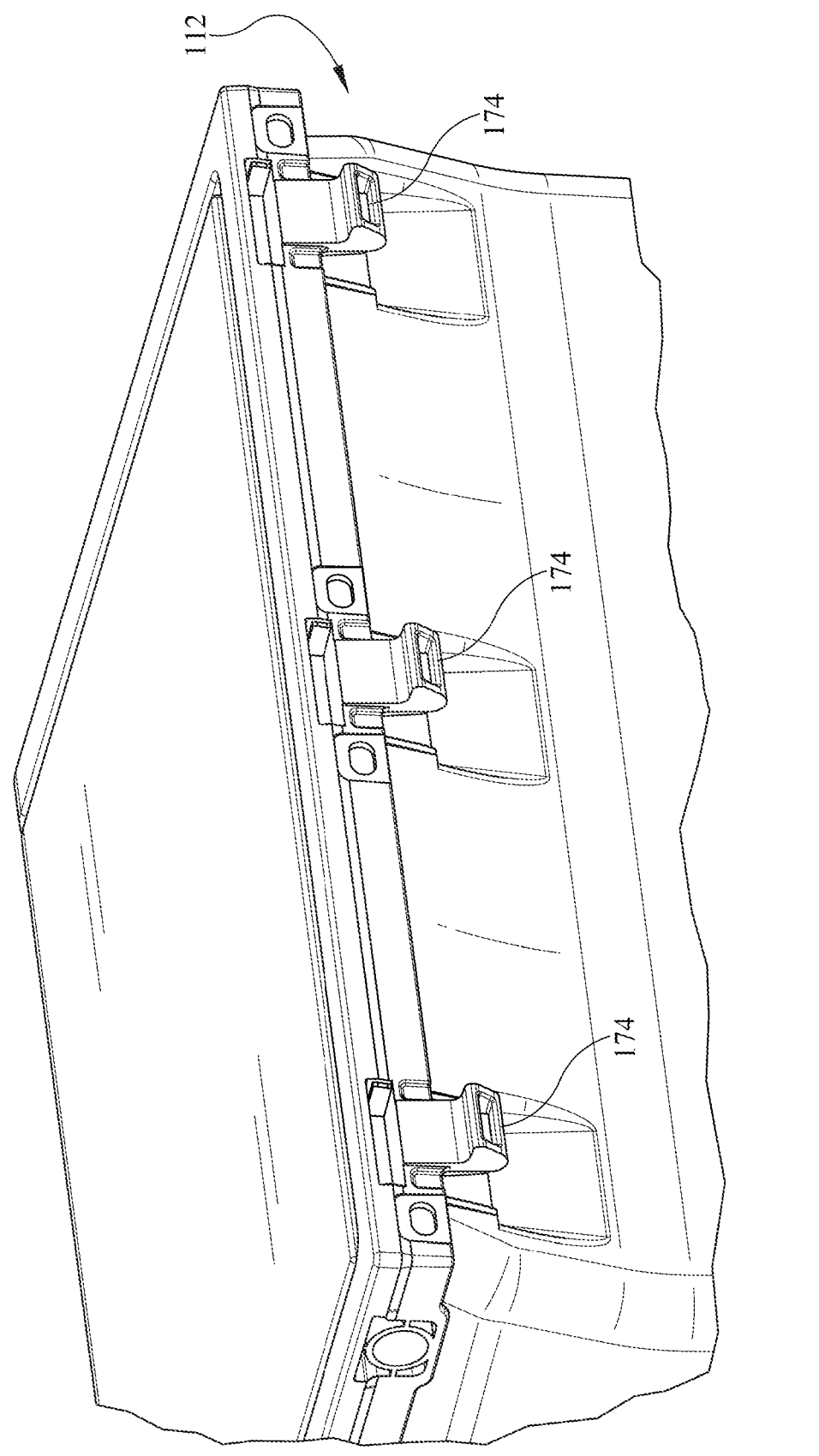
FIGS. 7-7A are views of locking tabs and their interaction with the console or compartment.
Figure 7A:
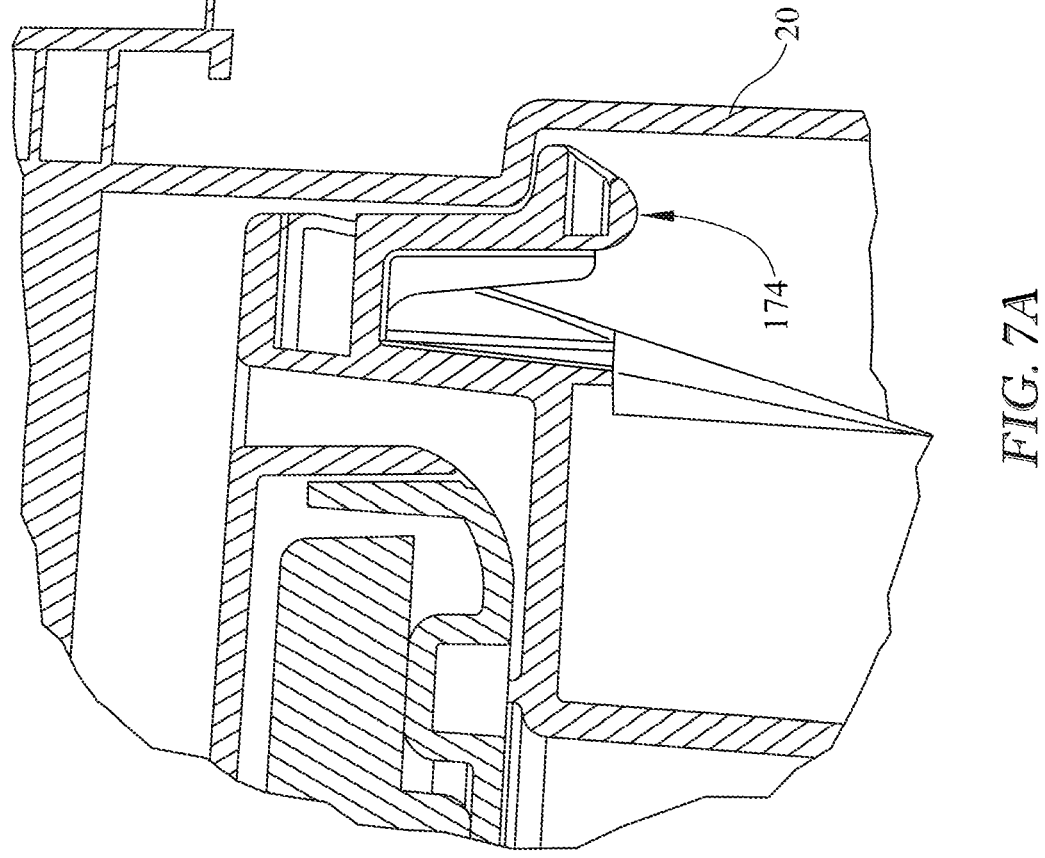

With reference to FIG. 6, a bottom view of the refrigerator 110 is shown. The grommets 172 are disposed in the console or compartment with the grommets 172. The grommets 172 may be located at various positions and may be at least partially dependent upon the shape and construction of the console or compartment 20. The number of grommets may vary and are not limited to the sketched amount or size of interface. Referring additionally to FIGS. 7 and 7A, a view of locking tabs 174 are shown along a rear edge of the housing 112. The locking tabs 174 may engage other portions of the compartment or console 20, and while the locking tabs 174 are shown along a rear edge, the locking tabs 174 may be located in other locations.

Figure 8:
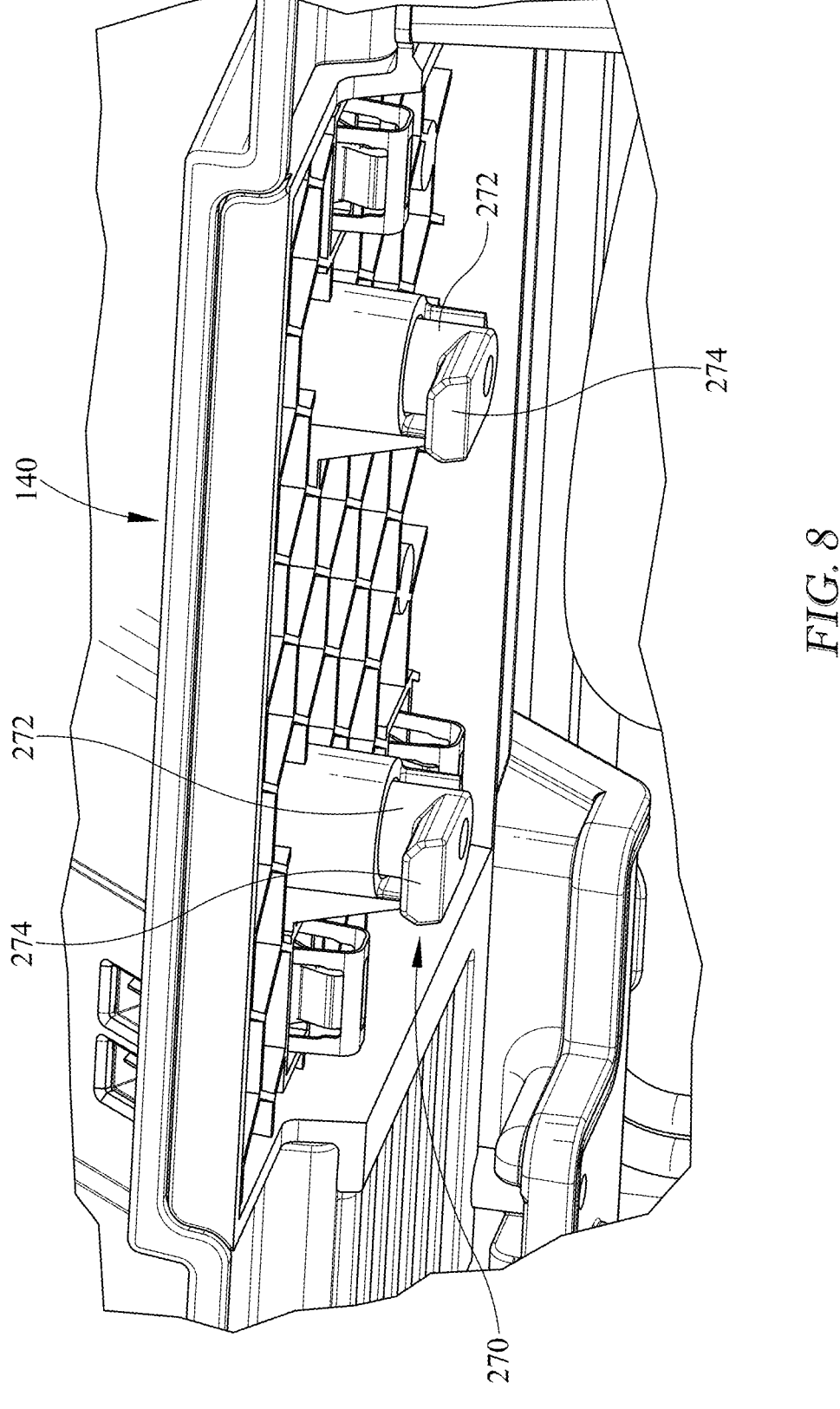
FIGS. 8-8A are views of alternate joints which are twist lock connections; and, FIG. 9 is a schematic view of a control system.
Figure 8A:
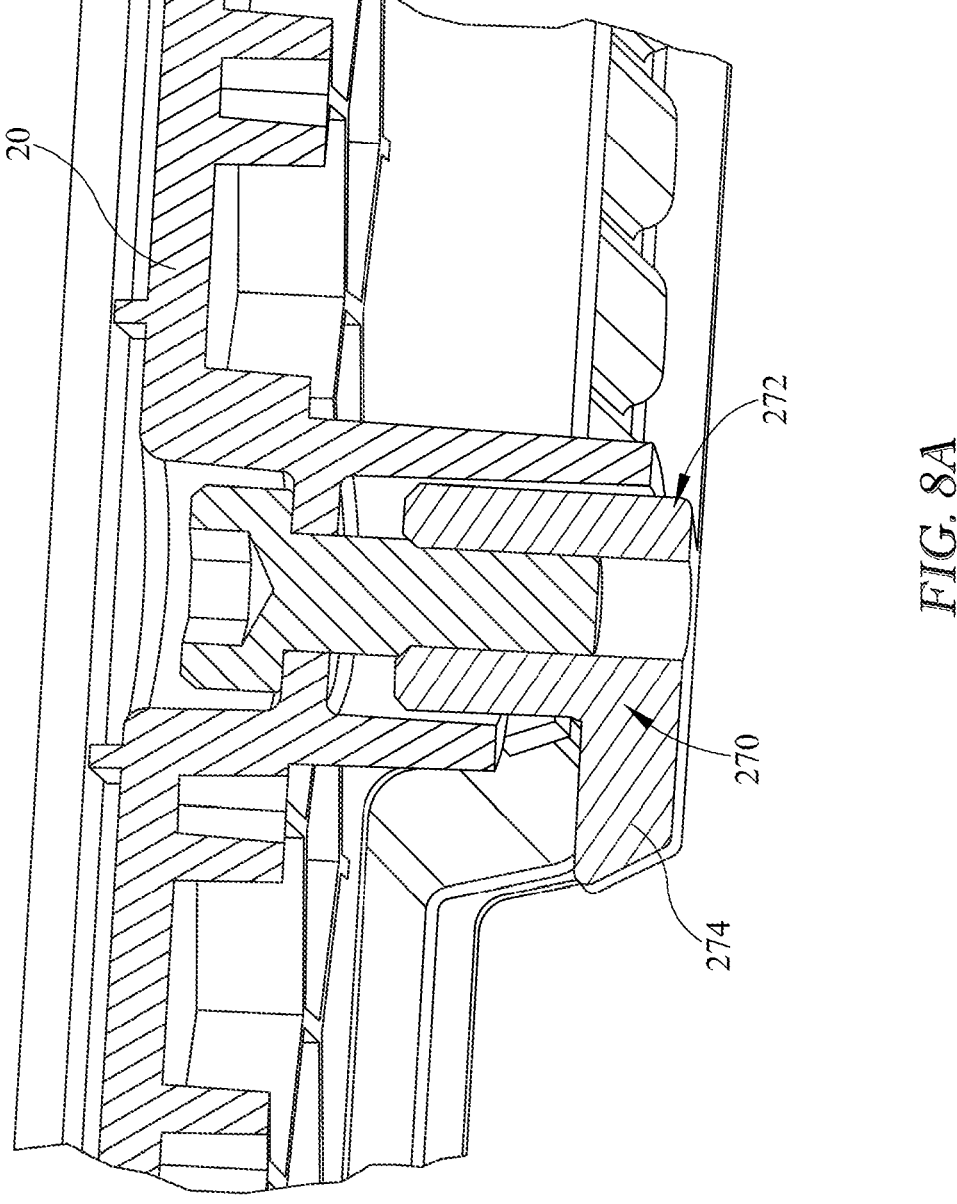

Referring now to FIGS. 8 and 8A, an alternate or additional joint embodiment is provided. The joint 270 may be a twist lock which comprise a leg 272 and foot 274. The leg 272 and foot 274 are rotatable with a screw connection on top of the tray 140. When the leg 272 and foot 274 rotate, the foot 274 can lock against and under an adjacent structure of the console or compartment 20. This joint 270 may be used as an alternative to the joints 170 or in addition to the joints 170.

Still further joints may be utilized. For example, the console may receive the refrigerator 110 (FIG. 2) in a press-fit or friction fit arrangement where the housing or a bracket structure frictionally engage with a corresponding portion of the console to retain the refrigerator in position.

The refrigerator 110, and more specifically the cooling mechanicals 120, may be powered in various manners. The refrigerator 110 may be powered by DC power of the vehicle, for example by hard wiring with a quick-disconnect or by a cigarette lighter power adapter. The refrigerator 110 may also include a battery 330 (FIG. 9) which is powered by connection to the vehicle power system. The battery 330 may allow for continued cooling when the refrigerator 110 is removed from the vehicle. For instance, the refrigerator 110 may be used as an active cooler for picnics or an active lunch box. Alternately, without the battery, the refrigerator may still be used passively for temporary storage when already cool, or with ice or cooling packs when removed from the vehicle 12, 14, 16 (FIG. 1).

Figure 9:
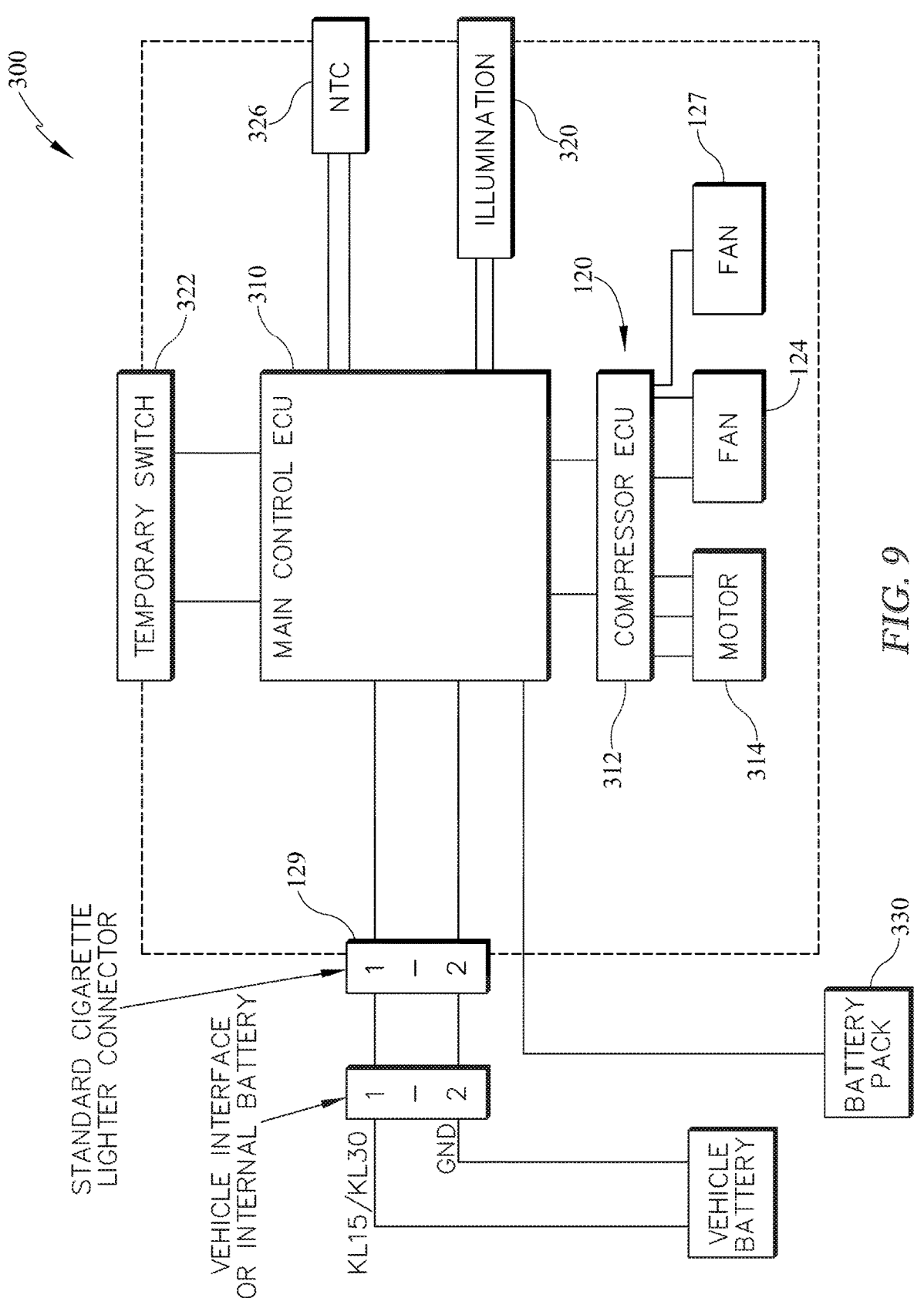

With reference now to FIG. 9, a schematic view of a control system is shown. The control system 300 has a controller 310, which may be embodied, in some examples, by a programmable processor or microprocessor. The controller 310 may be in communication with an electronic control unit (ECU) 312 of the compressor 125. The compressor 125 may also comprise a motor 314 which is controlled by the compressor ECU 312. The fan 124 is also shown in communication with the compressor ECU 312 so that the fan 124 operates when the compressor is on or when the temperature reach a threshold during compressor operation. The controller 310 may also be in communication with one or more thermometers or other temperature monitoring devices in order to monitor and control operation of the compressors 125 and fans 124, 127.

The controller 310 may also control illumination 320, for example around the power switch 322 (see also FIG. 3). The controller 310 may also be in electrical communication with the USB ports 326 (see also FIG. 3).

On the other side of the controller, the adapter 129 is shown for powered connection with the control system 300. The controller 310 may function to monitor the vehicle battery power, so as to shut down the refrigerator 110 if the power level of the battery reaches a lower threshold level. It should be a priority to have available power to start the vehicle if a separate battery is not utilized.

In some embodiments, the refrigerator 110 may also comprise a mini-battery, such as a portable battery pack 330. The battery pack 330 may plug into the system and power the refrigerator 110 when the refrigerator 110 is used as a lunch box or for a picnic. The system may use vehicle power to maintain charge on the battery pack 330.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A refrigerator, comprising:
a refrigerator housing having one or more walls and cooling mechanicals which remove heat from the refrigerator housing, the refrigerator housing configured to be positioned within a vehicle;
a heat exchange conduit located within the walls of the refrigerator housing to remove heat from an interior of said refrigerator housing;
said interior of the refrigerator housing defining a cavity for storage of food or beverage;
a joint capable of removably connecting said refrigerator housing to a console compartment of the vehicle, said joint comprising a twist lock which is rotatable about a vertical axis; and,
further comprising a frame extending from said refrigerator housing, said frame supporting the cooling mechanicals.

2. The refrigerator of claim 1, further comprising a tray.

3. The refrigerator of claim 2, said tray having one or more air intakes allowing air to access said cooling mechanicals.

4. The refrigerator of claim 1, said twist lock having a leg and a foot extending from said leg.

5. The refrigerator of claim 1, said joint further comprising at least one locking tab on an opposite side of said refrigerator housing from said twist lock.

6. The refrigerator of claim 1, said joint comprising an engagement between two or more parts.

7. The refrigerator of claim 6, said two or more parts comprising the refrigerator and the console compartment of the vehicle.

8. The refrigerator of claim 1, further comprising a housing insert.

9. The refrigerator of claim 8, said housing insert being a foam insert.

10. The refrigerator of claim 8, said housing insert being a bracket connected to said refrigerator housing.

11. The refrigerator of claim 10, a first portion of said joint connected to said bracket.

12. The refrigerator of claim 3, said tray disposed adjacent to said refrigerator housing and enclosing an opening between said refrigerator housing and said console compartment.

13. The refrigerator of claim 12, said one or more air intakes disposed above said cooling mechanicals.

14. The refrigerator of claim 1, said cooling mechanicals comprising a compressor, a condenser, and an evaporator.

15. The refrigerator of claim 1, further comprising wherein said console compartment is disposed in an automobile, marine craft, or a recreational vehicle.

16. The refrigerator of claim 1, said refrigerator housing capable of being removably positioned within said console compartment of a trunk, a frunk, or an interior of the vehicle.

17. The refrigerator of claim 1, wherein said refrigerator is capable of being used as a portable cooler.

18. The refrigerator of claim 17, wherein said refrigerator may be actively or passively cooled.

19. The refrigerator of claim 1, said joint comprising one or more fasteners.

20. A refrigerator, comprising:
a refrigerator housing having one or more walls defining an interior cavity wherein food or drinks may be located;
a lid pivotally connected to said refrigerator housing to open or close access to an interior of said housing;
the refrigerator housing configured to be positioned within a console of a vehicle;
a frame extending from said refrigerator housing, said frame supporting cooling mechanicals, which remove heat from the refrigerator housing;
said cooling mechanicals comprising a heat exchange conduit within said walls;
a tray disposed above said cooling mechanicals said tray comprising an air intake which allows airflow to said cooling mechanicals.

21. A refrigerator, comprising:
a refrigerator housing defining an interior cavity wherein food or drinks may be located, said refrigerator housing having one or more walls;
a lid pivotally connected to said refrigerator housing, said lid being movable between an open and a closed position;
a frame adjacent to said refrigerator housing, said frame supporting one or more cooling mechanicals thereon, the cooling mechanical defining a compression cooling system, said compression cooling system comprising a refrigerant conduit passing within said one or walls for cooling of said food or drinks therein;
said refrigerator housing and frame capable of being removably positioned within a vehicle console; and,
a tray disposed above said one or more cooling mechanicals;

wherein airflow moves through an air intake in said tray, around said one or more cooling mechanicals and is exhausted by a fan.

* * * * *